US012683840B2

(12) United States Patent
Kellermann et al.

(10) Patent No.: US 12,683,840 B2
(45) Date of Patent: Jul. 14, 2026

(54) TRANSMITTER AND RECEIVER FOR A COMMUNICATION SYSTEM, COMMUNICATION SYSTEM AND METHOD OF TRANSMITTING INFORMATION

(71) Applicants: Bayerische Motoren Werke Aktiengesellschaft, Munich (DE); Continental Automotive Technologies GmbH, Hannover (DE)

(72) Inventors: Helmut Kellermann, Oberschleissheim (DE); Christoph Arndt, Loiching (DE)

(73) Assignees: Bayerische Motoren Werke Aktiengesellschaft, Munich (DE); Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 18/719,838

(22) PCT Filed: Dec. 1, 2022

(86) PCT No.: PCT/EP2022/084099
§ 371 (c)(1),
(2) Date: Jun. 14, 2024

(87) PCT Pub. No.: WO2023/110441
PCT Pub. Date: Jun. 22, 2023

(65) Prior Publication Data
US 2025/0047533 A1 Feb. 6, 2025

(30) Foreign Application Priority Data
Dec. 15, 2021 (DE) .......................... 102021133295.8

(51) Int. Cl.
H04L 27/00 (2006.01)
H04L 12/40 (2006.01)

(52) U.S. Cl.
CPC .... *H04L 27/0002* (2013.01); *H04L 12/40032* (2013.01); *H04L 2012/40273* (2013.01)

(58) Field of Classification Search
CPC ..... H04L 27/00; H04L 27/0002; H04L 5/003; H04L 5/0058; H04L 5/0064; H04L 12/28;
(Continued)

(56) References Cited

U.S. PATENT DOCUMENTS 6,473,467 B1 * 10/2002 Wallace ................ H04L 5/0051
375/267
7,499,393 B2 * 3/2009 Ozluturk ................ H04L 5/006
370/335
(Continued)

FOREIGN PATENT DOCUMENTS

EP 1478148 A1 11/2004
JP 2004-40211 A 2/2004
(Continued)

OTHER PUBLICATIONS

Nam J et al: "Combined audio and visual streams analysis for video sequence segmentation", IEEE International Conference on Acoustics, Speech, and Signal Processing, 1997. ICASSP-97, Munich, Germany Apr. 21-24, 1997, Los Alamitos, CA, USA,IEEE Comput. Soc; US, US, Bd. 4, Apr. 21, 1997 (Apr. 21, 1997), pp. 2665-2668, XP010225704, DOI: 10.1109/ICASSP.1997.595337, ISBN: 978-0-8186-7919-3.

*Primary Examiner* — James M Perez
(74) *Attorney, Agent, or Firm* — 2SPL Patent Attorneys PartG mbB; Kieran O'Leary

(57) ABSTRACT

Embodiments of the present invention provide a transmitter (100) for a communication system comprising a modulator (110) configured to generate a transmit signal (120) while modulating information on a plurality of sub-bands
(Continued)

(120*a*, . . . , 120*d*), wherein at least two of the sub-bands (120*a*, . . . , 120*d*) have a different bandwidth.

9 Claims, 3 Drawing Sheets

(58) Field of Classification Search
CPC ............... H04L 12/40; H04L 12/40052; H04L 12/40065; H04L 12/40006; H04L 12/40032; H04L 27/26; H04L 27/2601; H04L 27/2647; H04L 27/2655; H04L 27/2666; H04L 1012/40267; H04L 1012/40273
See application file for complete search history.

(56) References Cited

U.S. PATENT DOCUMENTS

| | | | | |
|---|---|---|---|---|
| 7,542,446 | B2 * | 6/2009 | Mehta | H04B 7/0669 |
| | | | | 455/562.1 |
| 7,573,944 | B2 * | 8/2009 | Chang | H04L 27/2607 |
| | | | | 375/260 |
| 8,218,609 | B2 * | 7/2012 | Walton | H04L 1/0009 |
| | | | | 375/377 |
| 8,406,323 | B2 * | 3/2013 | Huang | H04L 27/26522 |
| | | | | 375/299 |
| 8,611,914 | B2 * | 12/2013 | Halfmann | H04W 16/10 |
| | | | | 455/447 |
| 8,638,652 | B2 * | 1/2014 | Cai | H04L 5/0023 |
| | | | | 370/344 |
| 8,699,607 | B2 * | 4/2014 | Seller | H04L 27/26524 |
| | | | | 375/267 |
| 8,761,303 | B2 * | 6/2014 | Griot | H04L 27/2607 |
| | | | | 375/135 |
| 8,861,549 | B2 * | 10/2014 | Koorapaty | H04L 5/0007 |
| | | | | 370/470 |
| 9,001,918 | B2 * | 4/2015 | Taori | H04W 72/04 |
| | | | | 375/284 |
| 9,306,639 | B2 * | 4/2016 | Burchard | H04B 7/026 |
| 9,538,533 | B2 * | 1/2017 | Suo | H04L 5/0062 |
| 9,621,389 | B2 * | 4/2017 | Nagalpur | H04L 27/2601 |
| 9,800,280 | B2 * | 10/2017 | Hedayati | H03F 1/08 |
| 10,033,566 | B2 * | 7/2018 | Simon | H04L 5/0044 |
| 10,069,541 | B2 * | 9/2018 | Etkin | H04L 27/364 |
| 10,750,502 | B2 * | 8/2020 | Ma | H04W 72/1263 |
| 10,958,326 | B2 * | 3/2021 | Rahman | H04W 72/0446 |
| 11,356,194 | B2 * | 6/2022 | Kondo | H04L 1/0001 |
| 12,028,142 | B2 * | 7/2024 | Smits | H04B 7/0691 |
| 12,132,685 | B2 * | 10/2024 | Kim | H04L 1/1893 |
| 2002/0154705 | A1 * | 10/2002 | Walton | H04B 7/0626 |
| | | | | 375/267 |
| 2003/0123383 | A1 * | 7/2003 | Korobkov | H04L 5/0037 |
| | | | | 370/208 |
| 2004/0047285 | A1 * | 3/2004 | Foerster | H04B 1/692 |
| | | | | 370/210 |
| 2004/0081131 | A1 * | 4/2004 | Walton | H04B 7/0854 |
| | | | | 370/344 |
| 2004/0120411 | A1 * | 6/2004 | Walton | H04B 7/0669 |
| | | | | 375/260 |
| 2004/0196919 | A1 * | 10/2004 | Mehta | H04L 1/0009 |
| | | | | 375/267 |
| 2005/0058089 | A1 * | 3/2005 | Vijayan | H04L 1/0065 |
| | | | | 370/312 |
| 2006/0034164 | A1 * | 2/2006 | Ozluturk | H04L 5/006 |
| | | | | 370/208 |
| 2006/0115011 | A1 * | 6/2006 | Tsuruta | H04B 7/0857 |
| | | | | 375/260 |
| 2006/0211426 | A1 * | 9/2006 | Costa | H04W 16/00 |
| | | | | 455/450 |

| | | | | |
|---|---|---|---|---|
| 2007/0274252 | A1 * | 11/2007 | Zhang | H04L 5/0064 |
| | | | | 370/328 |
| 2008/0240275 | A1 * | 10/2008 | Cai | H04L 5/0007 |
| | | | | 375/296 |
| 2008/0291974 | A1 * | 11/2008 | Collados | H04L 27/2637 |
| | | | | 375/130 |
| 2009/0190675 | A1 * | 7/2009 | Ling | H04L 27/2675 |
| | | | | 370/350 |
| 2009/0290541 | A1 * | 11/2009 | Nishio | H04L 1/001 |
| | | | | 370/328 |
| 2010/0002575 | A1 * | 1/2010 | Eichinger | H04L 27/3488 |
| | | | | 370/329 |
| 2010/0002789 | A1 * | 1/2010 | Karabinis | H04L 27/2647 |
| | | | | 375/260 |
| 2010/0041426 | A1 * | 2/2010 | Halfmann | H04W 16/10 |
| | | | | 455/509 |
| 2010/0234071 | A1 * | 9/2010 | Shabtay | H04B 7/155 |
| | | | | 455/562.1 |
| 2011/0032850 | A1 * | 2/2011 | Cai | H04L 5/0048 |
| | | | | 370/344 |
| 2011/0211541 | A1 * | 9/2011 | Yuk | H04L 5/001 |
| | | | | 370/329 |
| 2012/0281742 | A1 * | 11/2012 | Kliger | H04B 7/0617 |
| | | | | 375/220 |
| 2013/0235837 | A1 * | 9/2013 | Suo | H04L 5/0062 |
| | | | | 370/329 |
| 2014/0148093 | A1 * | 5/2014 | Nguyen | H04B 7/15507 |
| | | | | 455/11.1 |
| 2014/0369276 | A1 * | 12/2014 | Porat | H04L 5/003 |
| | | | | 370/329 |
| 2016/0294498 | A1 * | 10/2016 | Ma | H04L 27/2647 |
| 2016/0330695 | A1 * | 11/2016 | Benjebbour | H04L 1/0009 |
| 2017/0325236 | A1 * | 11/2017 | Yu | H04L 5/0091 |
| 2017/0366377 | A1 * | 12/2017 | Papasakellariou | H04L 5/005 |
| 2018/0015329 | A1 * | 1/2018 | Burich | A63B 24/0062 |
| 2018/0139773 | A1 * | 5/2018 | Ma | H04L 27/26025 |
| 2018/0279315 | A1 * | 9/2018 | Salem | H04L 5/0091 |
| 2018/0279317 | A1 * | 9/2018 | Yamada | H04B 17/24 |
| 2018/0366838 | A1 * | 12/2018 | Kim | H04W 4/40 |
| 2019/0173653 | A1 * | 6/2019 | Wu | H04L 5/0044 |
| 2019/0268192 | A1 * | 8/2019 | Lim | H04L 5/0012 |
| 2019/0296877 | A1 * | 9/2019 | Zhang | H04L 5/0048 |
| 2021/0013993 | A1 * | 1/2021 | Kondo | H04L 27/0008 |
| 2021/0105771 | A1 * | 4/2021 | Xin | H04L 5/0007 |
| 2022/0046662 | A1 * | 2/2022 | Takeda | H04L 5/0053 |
| 2022/0346091 | A1 * | 10/2022 | Karmoose | H04L 1/0041 |
| 2023/0006794 | A1 * | 1/2023 | Tervo | H04L 5/0051 |
| 2023/0015565 | A1 * | 1/2023 | Khesbak | H04B 1/40 |
| 2023/0087177 | A1 * | 3/2023 | Kim | H04B 7/0456 |
| | | | | 370/252 |
| 2023/0140472 | A1 * | 5/2023 | Lee | H04B 7/0602 |
| | | | | 343/702 |
| 2023/0179264 | A1 * | 6/2023 | Jang | H04W 16/28 |
| | | | | 375/262 |
| 2023/0179383 | A1 * | 6/2023 | Bhamri | H04L 5/0092 |
| | | | | 370/329 |
| 2023/0319805 | A1 * | 10/2023 | Vankayala | G06N 3/084 |
| | | | | 370/329 |
| 2023/0403056 | A1 * | 12/2023 | Berg | H04B 7/0617 |
| 2024/0031197 | A1 * | 1/2024 | Chamas | H04L 12/4625 |
| 2024/0088538 | A1 * | 3/2024 | Pfannenmüller | H04B 1/525 |
| 2024/0313880 | A1 * | 9/2024 | Yang | H04L 1/0003 |
| 2025/0024461 | A1 * | 1/2025 | Jeon | H04W 52/146 |
| 2025/0047533 | A1 * | 2/2025 | Kellermann | H04B 1/04 |

FOREIGN PATENT DOCUMENTS

| | | |
|---|---|---|
| JP | 2006-526343 A | 11/2006 |
| WO | 2019/176931 A1 | 9/2019 |

* cited by examiner

110

120

120a 120b 120c 120d

SNR
or
bit
loading sub-bands frequency data

150

100

210 transfer function

220 dBm/Hz

ADC max.
input power sub-bands 220a 220b 220c 220d frequency data

150

200

250 data

150 transmit power

Shannon-
Hartley's
law $$C_S = B \cdot \mathrm{ld}\left(1 + \frac{S}{N}\right) = B \cdot \mathrm{ld}\left(1 + \frac{S}{N_0 \cdot B}\right)$$

dBm/Hz

350

330

320 channel attenuation, variable depending on the distance
of the nodes dBm/Hz

310 our process noise
AMPs, DACs, ADCs dBm/Hz noise floor sub-band 1  sub-band 2  sub-band 3    sub-band 4 dBm d1 d2 f1   220a  220b      220c  220d        f2 f

500

610

620

630

710

720

730

TRANSMITTER AND RECEIVER FOR A COMMUNICATION SYSTEM, COMMUNICATION SYSTEM AND METHOD OF TRANSMITTING INFORMATION

CROSS-REFERENCE TO RELATED APPLICATIONS

This application is a 35 U.S.C. § 371(c) national stage entry of PCT/EP2022/084099, filed on Dec. 1, 2022. That application claimed priority to German Application 10 2021 133 295.8 filed on Dec. 15, 2021. The contents of these earlier filed applications are incorporated by reference herein in their entirety.

FIELD

Embodiments of the present invention relate to communication systems, transmitters and receivers for transmitting information, for example in a motor vehicle.

BACKGROUND

Communication systems are used in many applications, for example for communication between control, comfort and entertainment devices in motor vehicles. The electrical on-board networks and/or communication systems in vehicles are currently developing in the direction of zonalization with regard to cabling. Several separate zones are connected to each other by means of a communication system. One trigger for the trend towards zonalization is the high complexity of the customer-specific wiring harness. At the same time, several previously separate functions are often concentrated on powerful integration platforms. Between the resulting zones or zone integration modules and such integration platforms, a powerful backbone bus is required as part of the communication system, which may both transport large amounts of data and guarantee short latencies, i.e., which supports several use cases simultaneously. Switched Ethernet would in principle be suitable for this if the number of zones remains small, for example less than 5. This would be the case as long as zonalization is based on the granularity of the electric power supply in the vehicle. With greater zonalization in 10-25 zones, for example, a switched system would be too complex and expensive. However, zonalization in the direction of 20-25 zones is required if a wiring harness for vehicles is to be produced fully automatically.

The publication EP 1 478 148 A1 describes a method for communication between radio stations of a radio communication system using at least one frequency band divided into a number of sub-bands. The way in which the at least one frequency band is divided into the sub-bands varies.

Therefore, there may be a need to provide an improved communication system for an application in a motor vehicle, for example. Said demand is satisfied by the transmitters, receivers, communication systems and the vehicle of the independent claims.

SUMMARY

An embodiment of a transmitter for a communication system comprises a modulator configured to generate a transmit signal while modulating information on a plurality of sub-bands, wherein at least two of the sub-bands have a different bandwidth. Modulation to sub-bands of different widths may ensure that the required amount of information may be transmitted in each band, while at the same time the transceivers' electronics, in particular an analog-to-digital converter for digitizing an input signal, do not have to be oversized to provide the power reserves usually required in conventional applications.

An embodiment of a receiver for a communication system comprises a demodulator configured to demodulate an input signal with a plurality of sub-bands of different widths and to reconstruct the information transmitted in a sub-band. The ability to demodulate input signals with several sub-bands of different widths enables the use of an analog-to-digital converter in the receiver, which has to process less power compared to conventional solutions, making it more cost-effective, for example.

An embodiment of a communication system for a motor vehicle comprises a data bus, an embodiment of a first transmitter coupled to the data bus for transmitting information via the data bus, and an embodiment of a second transmitter coupled to the data bus for transmitting information via the data bus. Using the transmitters makes it possible to implement the communication system reliably and efficiently in a daisy chain architecture.

An embodiment of a method of transmitting information enabling this comprises modulating information on a first sub-band and modulating further information on a second sub-band, wherein the first sub-band and the second sub-band have a different bandwidth.

BRIEF DESCRIPTION OF THE FIGURES

Embodiments will be described in more detail below with reference to the accompanying figures, in which.

DETAILED DESCRIPTION

Various embodiments will now be described more fully with reference to the accompanying drawings in which some embodiments are illustrated. In the figures, the thickness dimensions of lines, layers and/or regions may be exaggerated for clarity.

Figures 1, 2, 3:
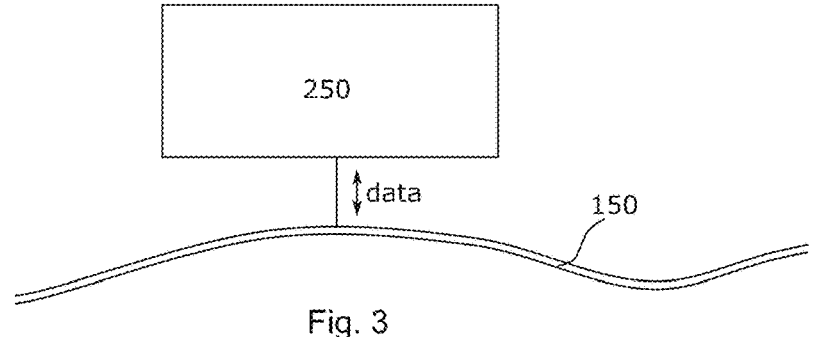
FIG. 1 is a schematic representation of a transmitter.
FIG. 2 is a schematic representation of a receiver.
FIG. 3 is a schematic representation of a transceiver.

FIG. 1 illustrates a schematic representation of an embodiment of a transmitter 100 for a communication system.

The transmitter is connected to a data bus 150 and comprises a modulator 110 configured to generate a transmit signal while modulating information on a plurality of sub-bands 120a, 120b, 120c and 120d, wherein at least two of the sub-bands have a different bandwidth. The modulation may be carried out using any modulation method and scheme. Each sub-band may in turn have a number of subcarriers, for example 256, 512 or 1024. In the example, 4 sub-bands 120a, 120b, 120c and 120d are shown, but in further embodiments, any larger or smaller number of sub-bands may be used. In another approach, in Orthogonal Frequency Division Multiplex (OFDM) methods using several sub-bands, sub-bands of the same bandwidth are used which are separated on the receiver side by means of an inverse Fourier transformation before the transmitted information and/or bits are demodulated. Compared to such conventional methods, the modulation on sub-bands of different widths may ensure that the required amount of information may always be transmitted in each band, while at the same time the transceiver electronics, in particular an analog-to-digital converter for digitizing an input signal, does not have to be oversized to provide the power reserves usually required in conventional applications. This would otherwise be necessary in particular if the transmission power per sub-band is not dynamically adjusted. If this remains constant over time, implementation is much less complex and less expensive. Furthermore, the communication overhead from the receiver to the transmitter for transmitting the received power, which would otherwise be necessary, is eliminated.

Figure 5:
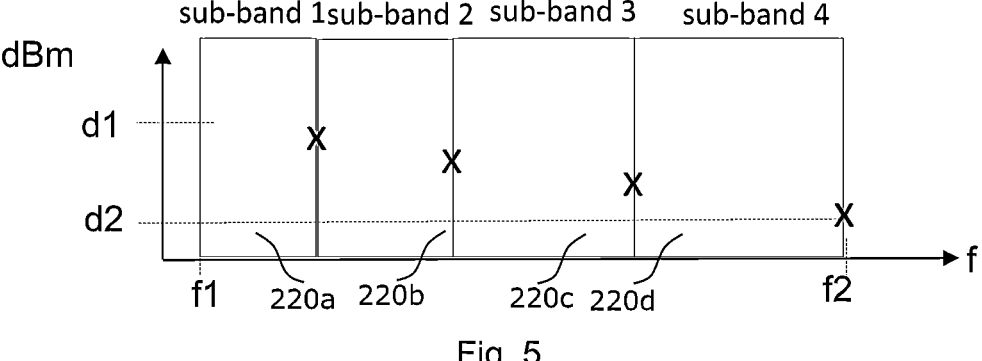
FIG. 5 is an illustration of the design of a communication system.

The advantage of sub-bands of different widths becomes apparent when looking at the receiver shown schematically in FIG. 2 and at the overall system, i.e., at a communication system that has several transmitters and receivers that are connected to each other in a daisy chain via a data bus, as shown schematically in FIG. 5. Although transmitters and receivers are initially shown separately in FIGS. 1 and 2 to better separate the aspects of transmitting and receiving, it should be noted that in many practical implementations a single device and/or one of the nodes 520a, ..., 520d shown in FIG. 5 may both transmit and receive on the data bus 510, i.e. contains a transceiver, as also shown schematically in FIG. 3.

According to some embodiments, only one of the transceivers of one of the nodes 520a-d may transmit at a time and in one sub-band or in a plurality of sub-bands on the communication medium and/or data bus 510, with a plurality of transceivers transmitting simultaneously on different sub-bands. According to further embodiments, different transceivers may also transmit simultaneously in identical sub-bands but using different sub-carriers.

FIG. 2 shows a schematic representation of a receiver. In order to be compatible with the transmitter 100 of FIG. 1, the receiver 200 includes a demodulator 210 which demodulates an input signal 220 with a plurality of sub-bands 220a, ..., 220d of different widths and reconstructs the information transmitted in a sub-band. In a communication system, transmitters and receivers in different nodes are connected to each other via a data bus of variable length. In addition, there may be further nodes in a daisy chain arrangement between two communicating nodes. Additional nodes located between two communicating nodes in turn cause additional insertion loss. Therefore, the receiver does not receive the power emitted by the transmitter, but one that is reduced depending on the length of the data bus between the transmitting transmitter and the receiving receiver and the number of nodes in between. The received power per sub-band 220a, ..., 220d reduced in this way is indicated schematically for the received signal 220 in FIG. 2. FIG. 2 shows the frequency on the X-axis and the power normalized to the frequency in dBm/Hz on the Y-axis. FIG. 2 shows the usual attenuation behavior of signals on an electrical conductor, in particular that signals of a higher frequency are attenuated more than those of a lower frequency. As a result, the signal power arriving at the receiver is lower for sub-bands with a higher center frequency than for sub-bands with a lower center frequency, provided the transmission power is identical for all sub-bands.

FIG. 3 shows a transceiver 250 connected to the data bus 150 for the sake of completeness only. The transceiver 250 has the capabilities of the transmitter 100 and the receiver 200 of FIGS. 1 and 2, so that it may both transmit data to the data bus 150 and read data from the same.

Figure 4:
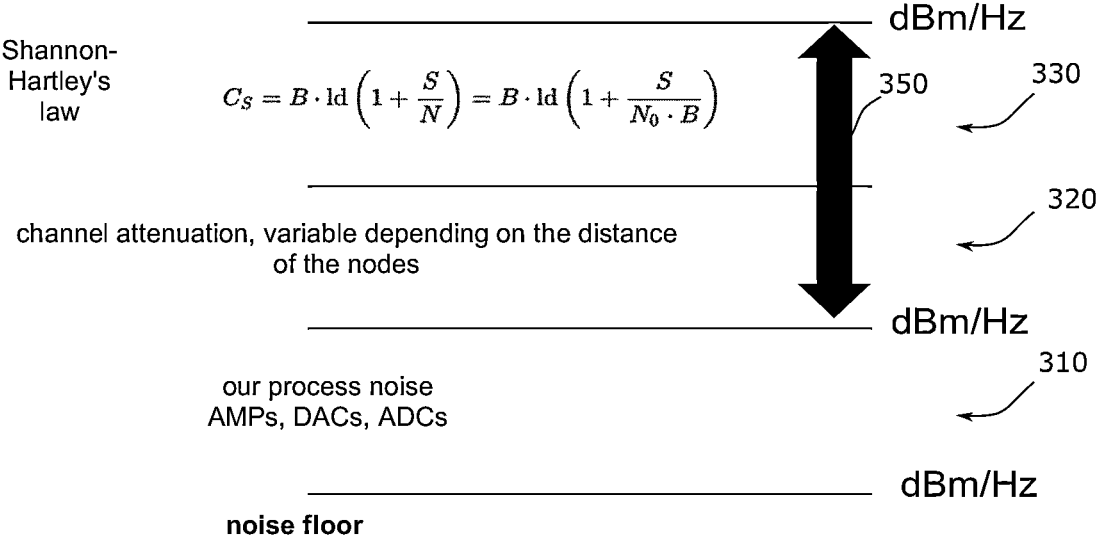
FIG. 4 illustrates the dependence of the transmittable bit rate on the bandwidth and the signal-to-noise ratio.

FIG. 4 shows an illustration of the dependence of the transmittable bit rate on the bandwidth of a sub-band and the signal-to-noise ratio. An ADC that digitizes an input signal in a receiver must be dimensioned in such a way that it may digitize the entire received power in all applications and configurations of the communication system. The selected modulation type determines a minimum resolution of the ADC and, together with the expected maximum power, the number of quantization stages and the dynamic range of the ADC. The input signal to be digitized is the baseband signal. The more quantization stages an ADC has, the more semiconductor space it requires, the more expensive and possibly the slower it becomes. The power components to be considered when designing an ADC in a receiver that digitizes the input signal over a broadband range are shown schematically in FIG. 3.

In other embodiments, the input signal could also be a baseband signal down-mixed from a carrier signal if the medium of the data bus may transport the higher frequencies when using a carrier signal.

For the following consideration, the property of the channel (in particular the channel attenuation) is essentially considered for the design of the system. Consequently, noise components of the process noise 310, which is essentially due to the design of the hardware, the cables and the PCB design, and the background noise, which may be understood in the sense of ambient noise in the vehicle, are not discussed in more detail. With regard to the system design, the components of the channel attenuation 320 and the bit rate and/or amount of information to be transmitted per sub-band 330 are then to be taken into account. The latter is described by Shannon-Hartley's law shown in FIG. 3. This law describes the number of transmittable bits as a function of the bandwidth B of the sub-band and the signal-to-noise ratio S/N. If the bandwidth B is set to 1 Hz, the result is the representation normalized to the frequency, i.e., the number of bits that may be transmitted per bandwidth. The maximum permitted length of the data bus and the maximum permitted number of nodes define the maximum channel attenuation and are included in the equation via the reduced signal power and the signal-to-noise ratio.

If, for example, a bit rate of 10 bits/Hz were to be transmitted, the equation would result in a required S/N of just over 30 dB.

If, as in conventional systems and in contrast to FIG. 2, all sub-bands were given the same bandwidth, either the ADC would have to be oversized or the bit rate would be wasted, as the channel attenuation depends on the distance between communicating nodes and, in particular, on the frequency. If one initially assumes a usual behavior of a channel attenuation increasing with frequency, the S/N decreases with increasing frequency. If one wanted to transmit the same amount of information per sub-band, the ADC would have to be designed in such a way that it may digitize the input signals of the highest-frequency sub-band with the required resolution. This would mean that the ADC would have to be oversized for the lower frequency sub-bands in order to be able to process their higher received power without clipping. If one did not want this, the bit rate would be wasted.

If, for example, one realistically assumed a linearly decreasing channel attenuation (e.g., between 0.1-0.5 dB/m) between a frequency f1 of 100 kHz and a frequency f2 of 300 MHz, the design of a communication system with the required constant bit rate per sub-band and 4 sub-bands 220a, . . . 220d would result in the situation illustrated in FIG. 4. In addition, an insertion loss per node of 1.5 dB and constant over the frequency may be realistically assumed.

The worst possible S/N values are to be used to calculate the widths of the individual sub-bands 220a, . . . , 220d. Due to the attenuation monotonically increasing with the frequency, these are the values marked with an X at the upper end of each of the sub-bands 220a, . . . , 220d. This results in the width of the respective sub-bands for the required bit rate or the bit rate per sub-band for the specified bandwidth. If, for example, an identical bit rate per sub-band is required, this results in the effective area spanned by the individual sub-bands 520a, . . . , 520d (width of the sub-band times attenuation at the critical point) being identical. If different transmission bandwidths and/or bit rates are required for each sub-band, different bandwidths may, of course, also result for the sub-bands if, for example, the ADCs used are to be dimensioned efficiently.

Figures 6, 7, 8:
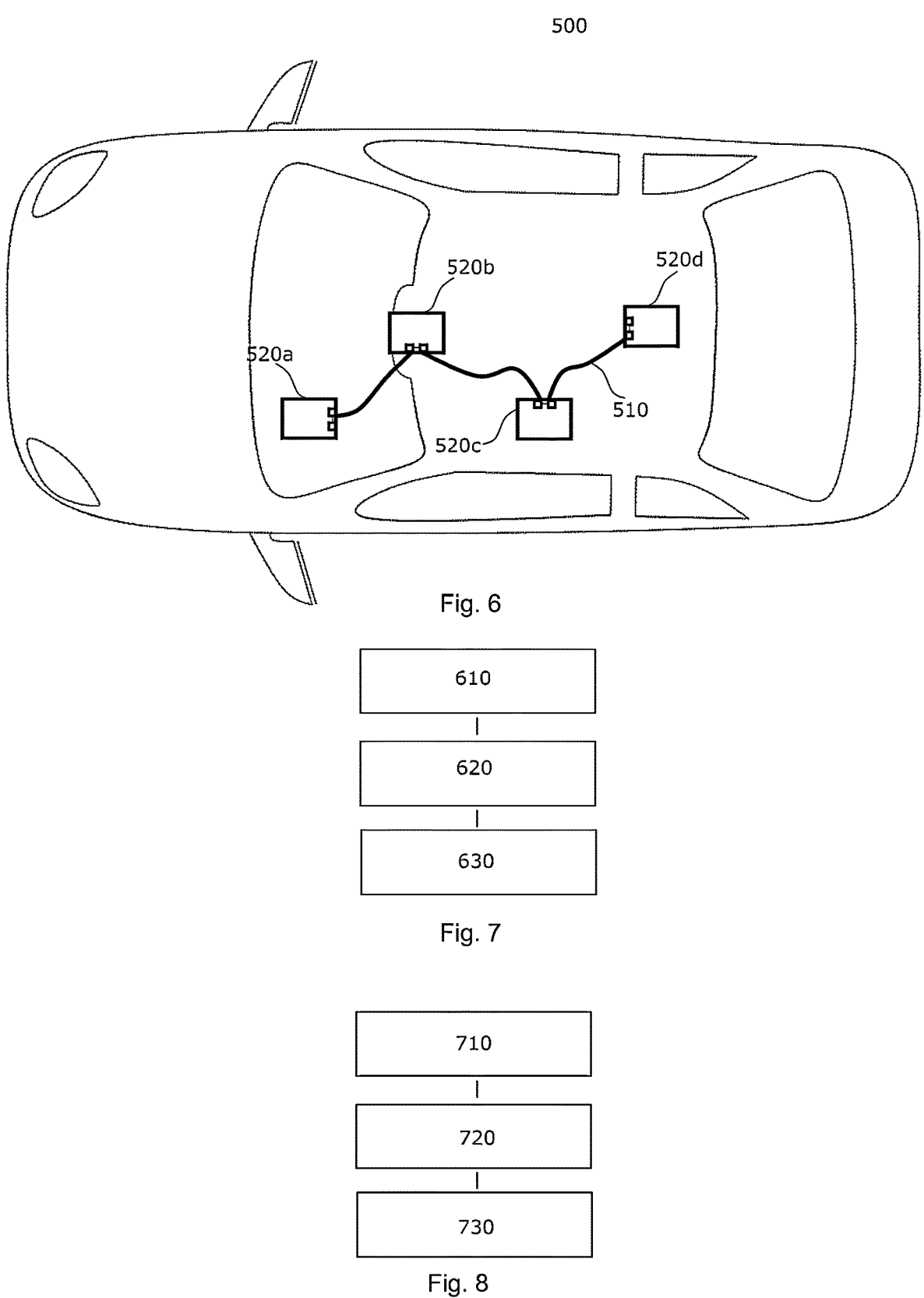
FIG. 6 is a schematic representation of a communication systems in a motor vehicle.
FIG. 7 is a flow chart of an embodiment of a method of receiving information.
FIG. 8 is a flow chart of an embodiment of a method of transmitting information.

As one possible use of the concept described herein, FIG. 6 shows a schematic representation of a communication system in a motor vehicle 500. The communication system has a wired data bus 510, to which several nodes 520a, . . . , 520d are coupled. The nodes 520a, . . . , 520d are arranged serially at the data bus 510 in a daisy chain arrangement. Each of the nodes 520a, . . . , 520d includes a transmitter or a receiver, or both, particularly where the individual nodes interconnect different zones of a zonalized architecture in a motor vehicle 500. The data bus 510 is a wired passive data bus 510 and is therefore a good and stable transport medium compared to cordless systems, for example. For example, a data bus according to an embodiment of the invention may use one or more pairs of wires of unshielded twisted pair (UTP), sheathed UTP, or shielded twisted pair (STP). One or more coaxial cables or optical fibers may also be used. In the passive daisy chain arrangement, the individual nodes 520a, . . . , 520d do not actively amplify the signal; the electronics are connected internally to the data bus, for example, via stub lines that are as short as possible. In the passive version, the two connections within the nodes are connected to each other and/or the connections are looped through between the possibly two connections for external connection of the nodes to the data bus.

For the sake of completeness, the essential steps of the methods carried out in the transmitters or receivers described above are briefly described again below and with reference to FIGS. 7 and 8.

First, a method of receiving information optionally comprises receiving a transport signal 610 from a data bus as an input signal for an ADC. The input signal is digitized by the ADC 620. Further, the method comprises demodulating 630 at least two sub-bands of different widths in the input signal in order to respectively reconstruct the information transmitted in the sub-bands (for example data bits).

A method of transmitting information comprises modulating information on a first sub-band 710 and modulating information (for example data bits) on a second sub-band 720, wherein the first sub-band and the second sub-band have a different bandwidth. The method further comprises transmitting a transmit signal 730 comprising the first sub-band and the second sub-band. The transmit signal may, for example, be the signal comprising the sub-bands directly or this signal may also be a signal that is generated by mixing the signal of the sub-bands to a transport signal.

In summary, the previously discussed embodiments of the invention enable OFDMA (Orthogonal Frequency Division Multiplex with an additional separation of sub-bands) as a physical layer for Ethernet, for example, with a broadband connection of all nodes via a passive daisy chain. Among other things, this allows the analog-to-digital converter (ADC) to be designed considering the required bit rates, the channel attenuation (daisy chain) and the bandwidth (in Hz or number of subcarriers) of the sub-bands.

Although in the foregoing the embodiments of the invention were essentially motivated by an application in a motor vehicle, further embodiments may be used in any other application in which robust and flexible data communication is required. Other criteria than just the attenuation of the channel itself may also be used to design the communication system and determine the bandwidths of the sub-bands. For example, the spectral transmission power may be limited in some applications, such as the G.HN standard for the application of data transmission via coaxial cable as well as via telephone cable (ITU-T G.9660). Such spectral masks may easily be considered in the design of a communication system in accordance with the above considerations.

LIST OF REFERENCE NUMERALS

100 transmitter
110 modulator
120 transmit signal
120a, . . . , 120d sub-band
150 data bus
200 receiver
210 demodulator
220 input signal
220a, . . . , 220d sub-band
250 transceiver
310 process noise
320 channel attenuation
330 power required for information transmission
350 dimensioning range
500 motor vehicle
510 data bus
520a, . . . , 520d nodes
610 receive
620 digitize
630 demodulate
710 modulate
720 modulate
730 send

The invention claimed is:

1. A transmitter for a communication system, comprising:
a modulator configured to generate a transmit signal while modulating information on a plurality of sub-bands, wherein at least two of the sub-bands have a different bandwidth and the amount of information modulated on each sub-band is identical.

2. The transmitter of claim 1, wherein a bandwidth of the plurality of sub-bands increases monotonically with the center frequency of the sub-bands.

3. The transmitter of claim 1, further comprising:
an output for the transmit signal, which is configured to be coupled to a wireline medium.

4. A communication system for a motor vehicle, comprising:
a data bus;
a first node with a first transmitter of claim 1 coupled to the data bus for transmitting information via the data bus; and at least one second node comprising a second transmitter of claim 1, which is coupled to the data bus for transmitting information via the data bus.

5. The communication system of claim 4, wherein the first node and the second node are coupled to the data bus in a daisy chain arrangement.

6. A motor vehicle with a communication system of claim 4.

7. A receiver for a communication system, comprising:

a demodulator configured to demodulate an input signal with a plurality of sub-bands of different width and to reconstruct the information transmitted in a sub-band such that the amount of information in each sub-band is identical.

8. The receiver of claim 7, further comprising:

an analog-to-digital converter configured to digitize a received signal and to provide the same as a digital input signal for the demodulator.

9. A method of transmitting information, comprising:

modulating information to a first sub-band;

modulating information to a second sub-band, wherein the first sub-band and the second sub-band have a different bandwidth and the amount of information modulated to the first sub-band and to the second sub-band is identical; and transmitting a transmit signal comprising the first sub-band and the second sub-band.

\* \* \* \* \*